Jan. 23, 1934.　　　H. E. LAFAYETTE　　　1,944,795
PARACHUTE RIP CORD APPARATUS
Filed May 1, 1931　　　3 Sheets-Sheet 1
FIG. 1.
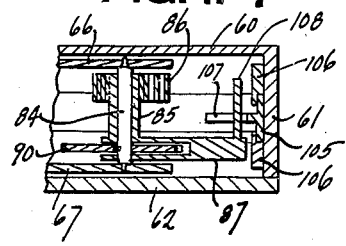
FIG. 11a.
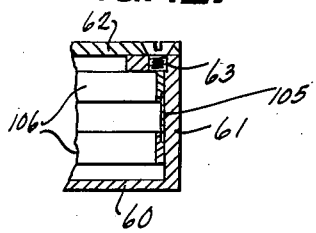
FIG. 12.
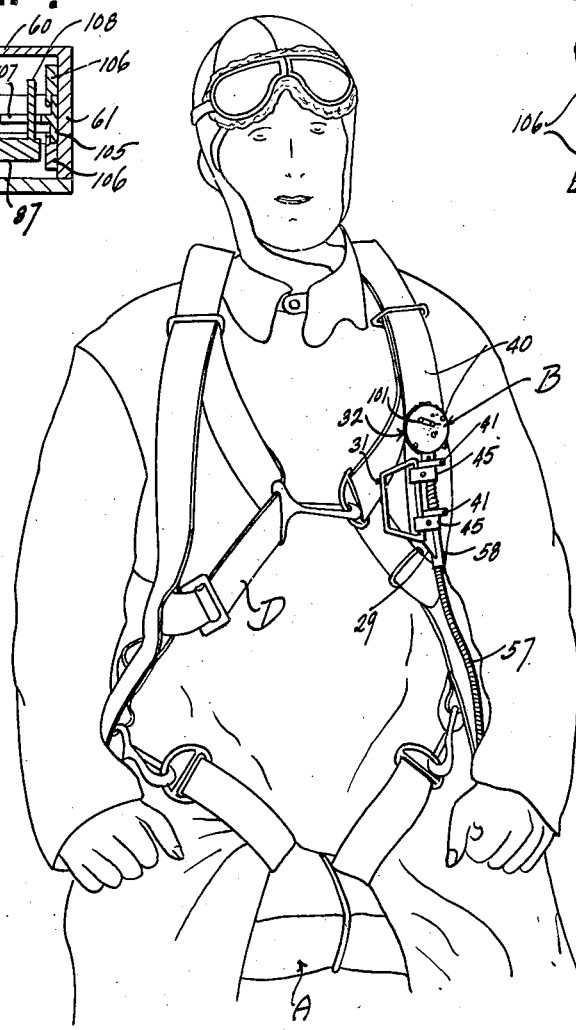
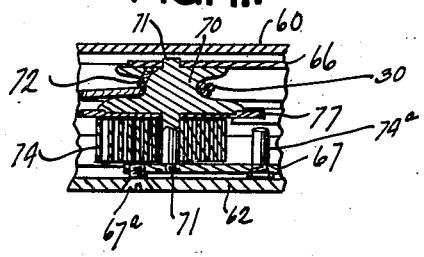
FIG. 11.
INVENTOR.
Harvey E. Lafayette
BY Lancaster, Allwine and Rommel
ATTORNEYS.

Jan. 23, 1934.   H. E. LAFAYETTE   1,944,795
PARACHUTE RIP CORD APPARATUS
Filed May 1, 1931   3 Sheets-Sheet 2
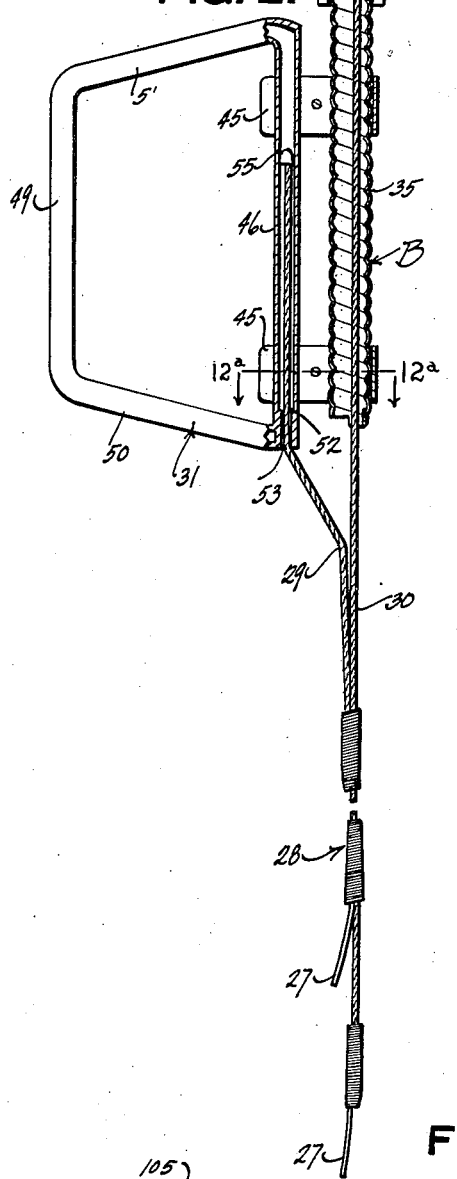
FIG. 2.
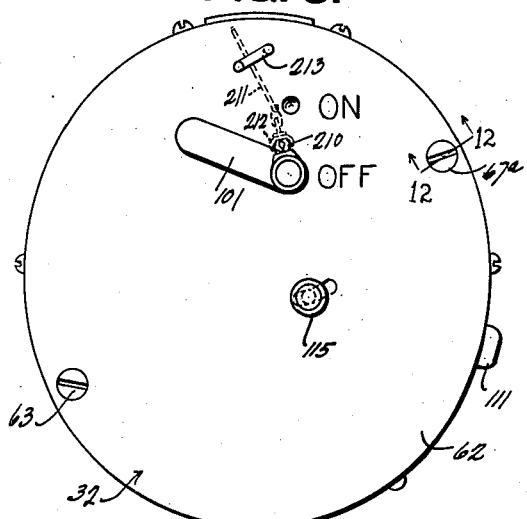
FIG. 3.
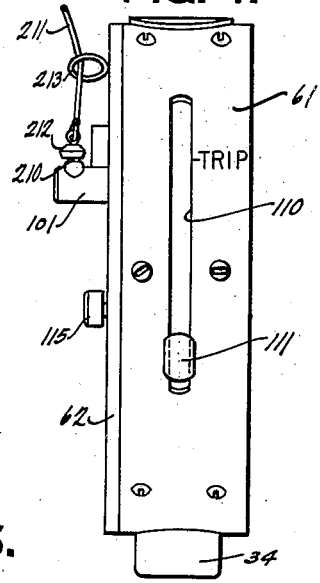
FIG. 4.
FIG. 5.
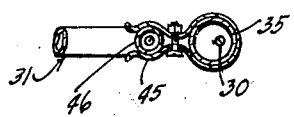
FIG. 12a.
INVENTOR.
Harvey E. Lafayette
BY Lancaster, Allwin and Rommel
ATTORNEYS.

Jan. 23, 1934.            H. E. LAFAYETTE            1,944,795
                    PARACHUTE RIP CORD APPARATUS
                Filed May 1, 1931        3 Sheets—Sheet 3
FIG. 6.
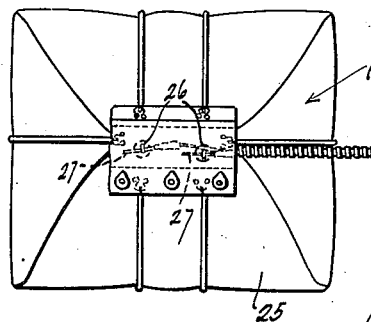
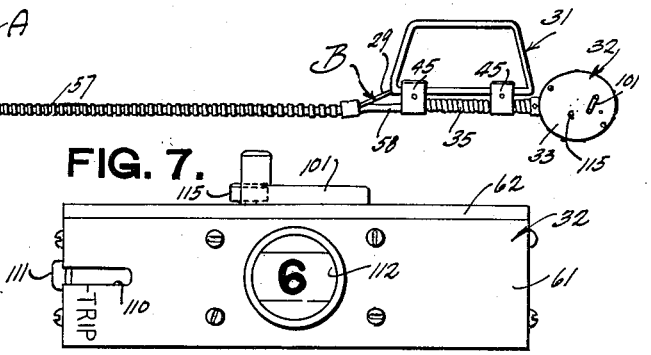
FIG. 7.
FIG. 8.                              FIG. 9.
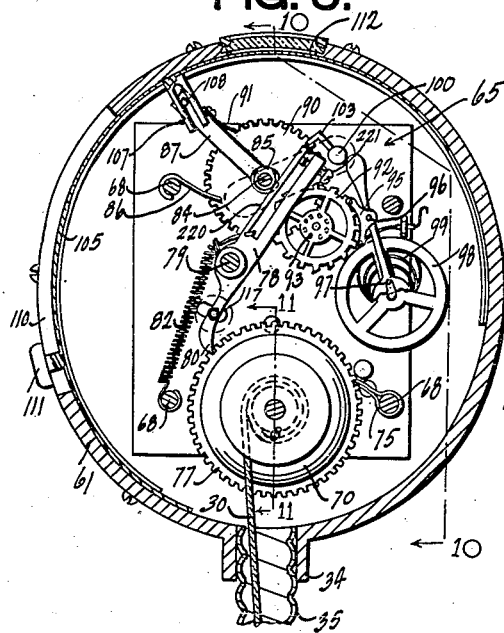
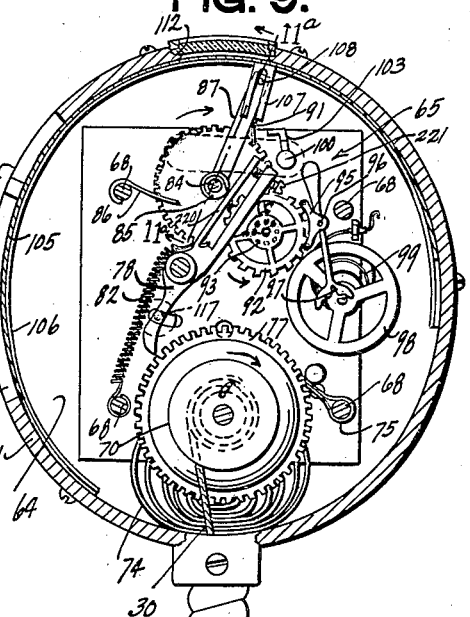
FIG. 10.
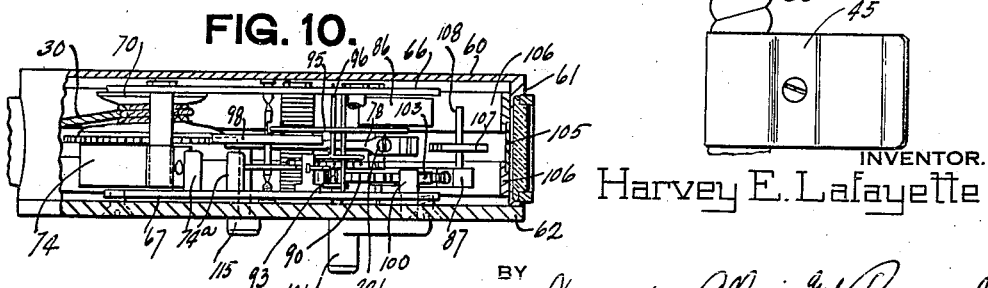
INVENTOR.
Harvey E. Lafayette
BY
Lancaster, Allwine and Rommel
ATTORNEYS.

Patented Jan. 23, 1934

1,944,795

UNITED STATES PATENT OFFICE 1,944,795

PARACHUTE RIP CORD APPARATUS

Harvey Emmite Lafayette, Waukegan, Ill., assignor to Irving Air Chute Company, Inc., Buffalo, N. Y., a corporation Application May 1, 1931. Serial No. 534,371

2 Claims. (Cl. 244—21)

This invention relates to improvements in parachute release mechanism.

The primary object of this invention is the provision of an improved timing mechanism for the automatic rip cord release of parachute containers and the like.

A further and important object of this invention is the provision of an improved parachute rip cord mechanism including means for selective manual or automatic timing release pull thereof.

A further and important object of this invention is the provision of an improved clock-work controlled rip cord release mechanism for parachute apparatus embodying an extremely practical and relatively simple arrangement which may be compactly and accessibly mounted upon the harness or clothing of an aviator, and which embodies improved means for selectively timing the automatic release of a parachute.

A further and important object of this invention is the provision of improved automatically operated time controlled parachute rip cord mechanism which will effectively release a parachute after a predetermined interval, and which may be useful in connection with the dropping of cargo from aircraft or the like.

A further object of this invention is the provision of improved clock work escapement mechanism for the automatic timing release of parachute apparatus.

Other objects and advantages of this invention will be apparent during the course of the following detailed description.

In the accompanying drawings, forming a part of this specification, and wherein similar reference characters designate corresponding parts throughout the several views, Figure 1 is a view showing the improved parachute rip cord mechanism including means for manual or automatic timed release pull thereof, in associated relation upon the harness of an aviator.

Figure 2 is a fragmentary sectional view showing the associated relation of the rip cord proper, with the aviator's rip cord handle and associated details, showing more particularly a lost motion connection between the handle and rip cord proper.

Figure 3 is a front elevation of the timing mechanism case, associated as part of the improved rip cord mechanism.

Figure 4 is an edge elevation of the case of Figure 3, showing more particularly a timing button.

Figure 5 is a developed view of a strip connected with the timing button which designates the seconds for selective setting of the timing mechanism.

Figure 6 is a view showing the associated relation of the improved rip cord mechanism with a parachute pack of conventional nature.

Figure 7 is a plan view of the timing mechanism, showing how the pilot or aviator determines the number of seconds at which the mechanism is set for release of the container.

Figure 8 is a sectional view taken through the case of the timing mechanism, showing the clockwork mechanism in set and locked position as it would appear for a six second timed release.

Figure 9 is a view similar to Figure 8, but with the clock-work mechanism in the position that the parts would assume after a release pull of the rip cord proper.

Figure 10 is a fragmentary sectional view taken substantially on the line 10—10 of Figure 8.

Figure 11 is a sectional view taken substantially on the line 11—11 of Figure 8, and showing more particularly the spring controlled rip cord drum on which the rip cord proper is wound for a release pull thereof.

Fig. 11$^a$ is a cross sectional view taken substantially on the line 11$^a$—11$^a$ of Figure 9.

Figure 12 is a fragmentary sectional view taken substantially on the line 12—12 of Figure 3, and showing more particularly the manner of assemblage of the case cover.

Figure 12$^a$ is a sectional view showing more particularly the manner of releasably mounting the rip cord handle in associated relation with the timing mechanism details.

In the drawings, wherein for the purpose of illustration is shown a preferred embodiment of the invention, the letter A may generally designate a parachute pack of conventional nature which receives parachute apparatus therein such as is in conventional use throughout the world, as more particularly and specifically detailed in U. S. Patents Nos. 1,340,423; 1,403,983; 1,462,456; 1,554,192, and 1,560,366. This pack includes the improved rip cord mechanism B.

The pack A as shown in the patents above referred to includes a container 25 wherein the parachute is packed; the parachute container 25 having associated therewith means for retaining the same closed, including eyelets on certain parts of the container through which transversely apertured buttons 26 are disposed, and in which apertured buttons the pin ends 27 of the rip cord proper 28 of the rip cord mechanism B are releasably threaded, in a manner which is well understood in this art, and specifically shown in the patents above referred to. It is well understood in the art that the pack A is either of the type which is permanently attached to the harness D of the aviator, or it may be of the detachable type, such as is shown in U. S. application for patent, Serial No. 395,399. The pack may be of the seat type, chest type, back type, or lap type. As is most conventional at the present time the pack will preferably be of the seat type, and in which event the rip cord mechanism B will be mounted upon the harness D of the aviator, such as is shown in Figure 1, in a relation easily observable and manually accessible to the aviator.

In the form of rip cord mechanism B the rip cord proper 28 at its end remote from the pins 27 is subdivided into flexible wire portions 29 and 30, which are respectively associated with a ring or handle 31 and clock-work operating mechanism 32, it being understood that the rip cord may be either manually operated by means of the handle 31 or automatically operated at a delayed interval by means of the clock-work mechanism 32. The clock-work mechanism 32 includes a preferably aluminum case 33, which is of rather flat circular form, from which extends an apertured attaching nipple 34. The latter may have attached therewith a flexible guard tube 35 of the conventional spirally wound metal type, which is rather short and which may be attached directly, and permanently if so desired, to a strap 40 of the aviator's harness, by suitable clips or means 41, in the position shown in Figure 1 of the drawings. The length 30 of the wire rip cord extends through this housing portion 35 and into the case of the clock-work mechanism 32, where it is operatively associated with suitable winding mechanism, as will be subsequently mentioned. The housing 35 may have associated therewith yieldable spring clips 45, each of which is provided with a pair of fingers yieldably urged towards each other for releasably clamping a bar portion 46 of the rip cord handle 31 in position with respect to the rip cord housing 35. This handle 31 is preferably of the general construction set forth in U. S. Patents Nos. 1,758,795 and 1,758,871, and includes the hand grasping bar 49 having the side bars 50 and 51 extending at opposite ends therefrom divergently; the remote ends of the side bars 50 and 51 being connected at opposite ends of the tubular bar portion 46 above mentioned. This bar portion 46 is hollow, as shown in Figure 2, and the rip cord portion 29 is collapsibly received therein; one end of the bar 46 being apertured at 53, and through which the rip cord portion 29 extends. At its free end the rip cord portion 29 is provided with a head section 55, which may abut against the shoulder 52 in the handle to limit the extent to which the rip cord portion 29 may move relative to the handle 49. This lost motion connection of the rip cord handle with the rip cord portion 29 is provided since the rip cord portion 30 is pulled for a considerable distance by the winding mechanism and to avoid external slack of the rip cord portion 29 it is received in the handle 31 during an automatic operation, as shown in Figure 2.

Flexible metallic guard tubing 57 is provided upon the harness D, connected with the tubing 35 by a suitable extension 58 which holds the end of the tubing 57 open to receive the rip cord portion 29; it being understood that both portions 29 and 30 extend thru the tubing 57 and may move relative therein for the purpose of releasing the parachute container when a pull is exerted upon the rip cord proper.

Referring in detail to the clock-work mechanism 32 the case structure 33 includes the rear wall 60 to which the circular or cylindrical wall 61 is marginally and preferably integrally connected, the front face 62 providing a detachable closure for the case, which is detachably held in place by set screws 63 as shown in Figure 12 of the drawings. The compartment 64 within the case preferably receives the clock-work details; the latter including a usual supporting frame 65 secured at 67ª, and consisting of plates 66 and 67 which are connected rigidly in parallel spaced relation by suitable posts 68. These plates 66 and 67 of course support the bushings and bearings for the rotary shaft and wheel details of the clock-work mechanism, as will be well understood. In the main, the improved clock-work mechanism includes a drum or spool 70 having shaft spindles 71 suitably bearing in the frame plates 66 and 67; this drum having the free end of the rip cord portion 30 fixedly connected at 72 thereto, and in position to permit the winding of the rip cord portion 30 upon the drum. A powerful spiral flat spring 74 is connected at one end to the spindle or shaft of the drum 70 and at its opposite end is connected as shown at 75 in Figure 8 of the drawings to one of the posts 68 of the clock-work frame mechanism; this spring 74 being normally tensioned and contracted so that as an incident of its expansion it will revolve the drum 70 for winding the rip cord 30 thereon and exerting a proper releasing pull upon the rip cord proper. In association with the drum 70 and keyed therewith there is provided a gear or ratchet wheel 77. A detent lever 78 is pivoted at 79 upon the frame 65 intermediate its ends, and at one end 80 it engages in a cooperative relation with the teeth of the ratchet wheel 77 so as to prevent rotation of the drum 70 as an incident of expansion of the spring 74. A spring 82 normally urges the end 80 of the lever 78 into engagement with the teeth of the ratchet wheel 77, as shown in Figure 8.

Means is provided for tripping the lever 78 after a predetermined elapsed interval. This consists of a shaft 84, having a trip cam sleeve 85 oscillatively mounted thereon, the position of the cam sleeve 85 upon the shaft with respect to the detent lever 78 being controlled by a lever arm 87. A spring 86 is connected with one of the posts 68 and at its other end it is connected with the cam sleeve 85 so as to normally rotate the latter for the purpose of throwing the eccentric cam portion against the lever 78 for tripping the latter. Keyed with the shaft 84 is a gear or ratchet wheel 90 upon the teeth of which a spring detent 91 operates; the latter being carried by the cam sleeve controlling arm 87. The detent 91 permits the cam sleeve to be reset, inasmuch as the detent will slide over the teeth of the gear 90 in one direction, but will engage the teeth and move with the gear as the gear 90 and the shaft 85 rotates incident to such movement by the escapement mechanism.

The escapement mechanism preferably consists of an escapement wheel 92, which is rotatably mounted between the plates of the frame 65 and which has the usual teeth or bars 93 meshing with the teeth of the gear wheel 90 for causing rotation of the latter. The teeth of the escapement wheel are associated with the usual escapement arm 95 pivoted at 96, which releases the wheel 92 step by step as the spring 86 urges the gear 90 in one direction. The oscillative escapement arm 95 is associated at one end in the usual manner with a pin 97 eccentrically positioned upon the balance wheel 98; the latter having associated therewith a hair spring 99 under such tension that it will normally bring the centers of the shaft 96, pin 97, and center of the balance wheel 98 into dead center alignment, as is shown in Figure 8. This assures that the escapement will be in position to come into action immediately that the shaft 84 is released, as will be subsequently described. The escapement mechanism is conventional in substantially all of its details except that the centers of the shaft 96, pin 97, and center of the wheel 98 are in dead center alignment during normal inoperative position of the escapement mechanism details.

In order to control the release of the shaft 84, there is provided a shaft 100 bearing in the cover plate 62 of the case, which on the external side of the cover plate 62 has an operating crank 101. The shaft extends through the plate 67 of the clock-work mechanism and adjacent the gear 90 is provided with a detent arm 103, shown in Figures 8 and 9 of the drawings, which is movable into and out of engagement with the teeth of the gear 90. As is shown in Figure 3 of the drawings the crank 101 is movable to an "on" or "off" position, which may be determined by some suitable spring plunger mechanism on the free end of the crank engageable in depressions or notches in the outer surface of the cover plate 62, and suitably designated by the delineations "on", "off". When the free end of the crank 101 is on the "off" position the detent arm 103 will engage with the teeth of the gear 90 to hold the clock-work mechanism inoperative, but as soon as moved to the "on" position the said arm 103 will be moved to the position shown in Figure 9 of the drawings and will permit the spring 86 to set the gear 90 in rotation in the direction shown by the arrow in Figure 9 of the drawings, and advance step by step in that direction as permitted by the escapement mechanism which instantly comes into operation. It is obvious that inasmuch as the spring arm 91 holds the lever 87 keyed with the gear 90, the cam 85 will be rotated for tripping the lever 78 as above mentioned.

Means is provided to initially set the cam 85 in a position so that its eccentric will engage and trip the lever 78 after a selective predetermined interval. This delay interval is under the control of the aviator and consists of a segmental strip of metal 105 which is suitably guided in position in relatively spaced segmental tracks 106, so that the strip 105 may move circumferentially on the inner periphery of the circular body portion 61 of the case. This segmental strip 105 is provided with a bifurcated arm 107 defining a slot wherein a laterally extending pin 108 upon the cam controlling lever arm 87 rides. The circular body portion 61 of the housing or case 32 is slotted at 110 for a portion of the circumference thereof, through which slot 110 extends a timing button 111 fixedly connected with the strip 105, which sets the strip 105 to a predetermined position. The strip 105 has delineations thereon, as designated in Figure 5, preferably numerically ranging from 1 upwardly. These numerals designate seconds and they are visible through a suitable lens covered opening 112 provided in the top of the case. As is shown in Figure 7 of the drawings the operator has moved the timing button 111 to a position which shifts the strip 105 so that the numeral 6 on the strip is visible through the lens covered opening 112. This operation through the slotted arm 107 has moved the cam controlling arm 87 to the position shown in Figure 8 and the eccentric on the cam sleeve 85 is now positioned with respect to the lever 78 so that the latter will be tripped at the end of a six second interval after the detent arm 103 has been lifted off the teeth of the gear wheel 90. It is obvious that the timing button 111 may be moved to render any of the numerals on the strip visible through the lens covered opening 112. During the resetting action when the timing button 111 is being moved from the trip position as designated in Figure 4, the spring detent 91 will slide over the gear teeth of the wheel 90, as is quite apparent.

It is at once apparent that as soon as the detent lever 78 has been moved off the teeth of the ratchet wheel 77 the spring 74 will throw the drum 70 into rotation for winding the rip cord portion 30 thereon. This of course pulls the pins 27 from the restraining cones on the pack A, and the container of the parachute pack is opened for permitting the parachute equipment therein to deploy in the usual manner. Through the resetting mechanism the clock-work may be made to cause an automatic rip cord pull after the lapse of one or more seconds. In event an emergency arises which necessitates an immediate release of the drum restraining pawl 78 the operator need merely grasp the button 115 shown in Figure 3 of the drawings and throw the same slightly to the right. This button 115 is connected, as shown at 117, with the restraining end of the pawl lever 78, and inasmuch as the clock-work frame and case 32 are suitably slotted this release of the pawl 78 may be immediately effected. This emergency release may be made a part of the automatic timing mechanism if desired, or it may be omitted.

In event the aviator desires to manually pull the rip cord it is merely necessary to grasp the handle bar 49 of the rip cord ring or handle 31 and pull the same free from the spring clamps 45. A jerk will pull the rip cord portion 29 and when the head 55 engages the shoulder 57 the rip cord proper will be moved to release the pins 27 from the restraining cones on the pack.

The improved combined manually and automatically operated rip cord device will find acceptable use in connection with parachute drops by human beings and also in connection with the dropping of cargo by means of parachutes. In the latter instance the automatic control mechanism will be set for the predetermined interval and put into operation as soon as the cargo is thrown from the plane. After the desired time interval the parachute container will be opened for deploying the parachute and dropping the cargo with safety. In event of its use by individuals the automatic control may be stopped at will and reset even during the making of a parachute jump. It is noteworthy that the automatic release may be operated by a practically helpless or injured person with ease.

Means is provided to actuate the starting device automatically, if desired. This may comprise a cord, one end of which can be permanently attached to the aircraft and the other attached to the starting button or handle which sets the clock-work mechanism in operation. This cord may be of the so-called "break cord" variety, or as shown in Figures 3 and 4 of the drawings, the cord 211 may be releasably attached to the starter button or handle by one of the conventional "lift-the-dot" fasteners. Thus, the cord 211 may have the female fastener part 212 secured therewith which releasably engages with the male fastener part 210 suitably connected upon the crank end of the handle 101. To accurately insure the operation of the starter button or handle 101, since the aviator does not always fall upright from the aircraft, it is preferred to provide a guard loop 213 secured to the casing, thru which the rip cord is guided.

It is contemplated that in cases where the accident to the aircraft is serious enough to have the passengers and aviator make an emergency jump, yet where there is sufficient time for instruction, that the aircraft steward or other attendant assisting the passengers to escape will press or operate the starter button which sets the clock-work mechanism in operation immediately prior to jumping from the ship.

The detent lever 78 is bifurcated to provide one yieldable arm portion which is designated at 220, and which operates directly against the trip cam. This arm 220 may be controlled by means of an adjusting screw 221 so as to permit of a trip release at fractions of a second.

Various changes in the shape, size, and arrangement of parts may be made to the form of invention herein shown and described, without departing from the spirit of the invention or the scope of the claims.

I claim:

1. In clock-work mechanism for automatically controlling the release of parachutes the combination of a supporting frame, a rotary trip member, an escapement wheel, means connecting the escapement wheel for operation of the rotary trip member, a balance wheel, a hair spring for operating the balance wheel, an oscillative escapement lever pivoted upon the frame for step by step advancement of the escapement wheel, and a pin eccentrically connected on the balance wheel in conventional operative association with said oscillative escapement lever, the hair spring being so tensioned as to place the center of the said lever, the center of said pin and the center of the balance wheel all in alignment on dead center during the stationary positioning of said escapement wheel.

2. In an automatic rip cord pulling device the combination of a flexible rip cord, a drum for the winding of the rip cord thereon, a spring normally rotating the drum in one direction, a detent member normally restraining the rotation of said drum in the direction as urged by said spring, means for the emergency operation of said detent member to release said drum, and means for the selective tripping of said detent after a delayed interval.

HARVEY EMMITE LAFAYETTE.